US009122877B2

(12) United States Patent
Alperovitch et al.

(10) Patent No.: US 9,122,877 B2
(45) Date of Patent: Sep. 1, 2015

(54) SYSTEM AND METHOD FOR MALWARE AND NETWORK REPUTATION CORRELATION

(75) Inventors: Dmitri Alperovitch, Atlanta, GA (US); Sven Krasser, Atlanta, GA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/052,739

(22) Filed: Mar. 21, 2011

(65) Prior Publication Data

US 2013/0247201 A1   Sep. 19, 2013

(51) Int. Cl.
H04L 29/06       (2006.01)
G06F 21/57       (2013.01)

(52) U.S. Cl.
CPC ............ G06F 21/577 (2013.01); H04L 63/145 (2013.01); G06F 2221/034 (2013.01); H04L 2463/144 (2013.01)

(58) Field of Classification Search
CPC . H04L 63/14; H04L 63/1483; H04L 63/1441; H04L 63/145
USPC .......................... 726/24, 22, 23; 709/206, 225
See application file for complete search history.

(56) References Cited

U.S. PATENT DOCUMENTS

| | | | |
|---|---|---|---|
| 5,970,066 A | | 10/1999 | Lowry et al. |
| 5,987,610 A | | 11/1999 | Franczek et al. |
| 6,073,142 A | | 6/2000 | Geiger et al. |
| 6,460,050 B1 | | 10/2002 | Pace et al. |
| 7,305,709 B1 | * | 12/2007 | Lymer et al. ..................... 726/25 |
| 7,415,727 B1 | * | 8/2008 | Lowe et al. ...................... 726/24 |
| 7,506,155 B1 | | 3/2009 | Stewart et al. |
| 7,555,776 B1 | * | 6/2009 | Lymer et al. ..................... 726/22 |
| 7,680,890 B1 | * | 3/2010 | Lin ............................... 709/206 |
| 7,681,032 B2 | | 3/2010 | Peled et al. |
| 7,712,134 B1 | | 5/2010 | Nucci et al. |

(Continued)

FOREIGN PATENT DOCUMENTS

| | | |
|---|---|---|
| JP | 2009-296036 | 12/2009 |
| JP | 2010-079901 | 4/2010 |

(Continued)

OTHER PUBLICATIONS

Ford, R.; Allen, W.H.; , "Malware Shall Greatly Increase . . . ," Security & Privacy, IEEE , vol. 7, No. 6, pp. 69-71, Nov.-Dec. 2009.*

(Continued)

Primary Examiner — S. Ali Zaidi
(74) Attorney, Agent, or Firm — Patent Capital Group

(57) ABSTRACT

A method is provided in one example embodiment and includes receiving a reputation value based on a hash of a file making a network connection and on a network address of a remote end of the network connection. The network connection may be blocked if the reputation value indicates the hash or the network address is associated with malicious activity. In more specific embodiments, the method may also include sending a query to a threat analysis host to request the reputation value. Additionally or alternatively the reputation value may be based on query patterns in particular embodiments. In yet more specific embodiments, the network connection may be an inbound connection and/or an outbound connection, and the reputation value may be based on a file reputation associated with the hash and a connection reputation associated with the network address of the remote end of the network connection.

24 Claims, 7 Drawing Sheets

(56) References Cited

U.S. PATENT DOCUMENTS

| | | | |
|---|---|---|---|
| 7,870,203 B2 | 1/2011 | Judge et al. | |
| 7,937,480 B2 | 5/2011 | Alperovitch et al. | |
| 7,953,814 B1 | 5/2011 | Chasin et al. | |
| 8,042,181 B2 | 10/2011 | Judge | |
| 8,045,458 B2 | 10/2011 | Alperovitch et al. | |
| 8,069,481 B2 | 11/2011 | Judge | |
| 8,132,250 B2 | 3/2012 | Judge et al. | |
| 8,201,257 B1 | 6/2012 | Andres et al. | |
| 8,239,915 B1* | 8/2012 | Satish et al. | 726/1 |
| 8,341,724 B1 | 12/2012 | Burns et al. | |
| 8,381,289 B1 | 2/2013 | Pereira et al. | |
| 8,621,618 B1 | 12/2013 | Ramsey et al. | |
| 8,931,043 B2 | 1/2015 | Cooper et al. | |
| 2004/0047356 A1* | 3/2004 | Bauer | 370/401 |
| 2005/0021740 A1* | 1/2005 | Bar et al. | 709/224 |
| 2006/0015561 A1 | 1/2006 | Murphy et al. | |
| 2006/0015563 A1* | 1/2006 | Judge et al. | 709/206 |
| 2006/0031314 A1 | 2/2006 | Brahms et al. | |
| 2006/0253447 A1* | 11/2006 | Judge | 707/9 |
| 2006/0253458 A1* | 11/2006 | Dixon et al. | 707/10 |
| 2006/0253579 A1* | 11/2006 | Dixon et al. | 709/225 |
| 2006/0253581 A1* | 11/2006 | Dixon et al. | 709/225 |
| 2006/0265747 A1* | 11/2006 | Judge | 726/22 |
| 2006/0267802 A1* | 11/2006 | Judge et al. | 340/995.1 |
| 2007/0002769 A1 | 1/2007 | Matityahu et al. | |
| 2007/0056035 A1* | 3/2007 | Copley | 726/22 |
| 2007/0078675 A1* | 4/2007 | Kaplan | 705/1 |
| 2007/0079379 A1* | 4/2007 | Sprosts et al. | 726/24 |
| 2007/0083929 A1* | 4/2007 | Sprosts et al. | 726/22 |
| 2007/0107059 A1* | 5/2007 | Chasin et al. | 726/23 |
| 2007/0130350 A1 | 6/2007 | Alperovitch et al. | |
| 2007/0130351 A1 | 6/2007 | Alperovitch et al. | |
| 2007/0162587 A1 | 7/2007 | Lund et al. | |
| 2007/0220607 A1* | 9/2007 | Sprosts et al. | 726/24 |
| 2007/0244974 A1* | 10/2007 | Chasin | 709/206 |
| 2007/0289015 A1* | 12/2007 | Repasi et al. | 726/22 |
| 2008/0022384 A1* | 1/2008 | Yee et al. | 726/11 |
| 2008/0133540 A1* | 6/2008 | Hubbard et al. | 707/10 |
| 2008/0162265 A1* | 7/2008 | Sundaresan et al. | 705/10 |
| 2008/0175226 A1* | 7/2008 | Alperovitch et al. | 370/352 |
| 2008/0175266 A1 | 7/2008 | Alperovitch et al. | |
| 2008/0178259 A1 | 7/2008 | Alperovitch et al. | |
| 2008/0229422 A1 | 9/2008 | Hudis et al. | |
| 2008/0244744 A1 | 10/2008 | Thomas et al. | |
| 2008/0282338 A1* | 11/2008 | Beer | 726/12 |
| 2009/0007102 A1 | 1/2009 | Dadhia et al. | |
| 2009/0150236 A1 | 6/2009 | Price | |
| 2009/0172818 A1 | 7/2009 | Sutherland et al. | |
| 2009/0178142 A1 | 7/2009 | Lieblich et al. | |
| 2009/0222877 A1 | 9/2009 | Diehl et al. | |
| 2009/0232300 A1 | 9/2009 | Zucker et al. | |
| 2009/0328209 A1 | 12/2009 | Nachenberg | |
| 2010/0077445 A1 | 3/2010 | Schneider et al. | |
| 2010/0223349 A1 | 9/2010 | Thorson | |
| 2010/0242082 A1 | 9/2010 | Keene et al. | |
| 2010/0306846 A1 | 12/2010 | Alperovitch et al. | |
| 2011/0040825 A1 | 2/2011 | Ramzan et al. | |
| 2011/0067086 A1 | 3/2011 | Nachenberg et al. | |
| 2011/0197275 A1 | 8/2011 | Chasin et al. | |
| 2011/0305141 A1 | 12/2011 | Horovitz | |
| 2012/0096516 A1* | 4/2012 | Sobel et al. | 726/2 |
| 2012/0174219 A1 | 7/2012 | Hernandez et al. | |
| 2012/0291087 A1 | 11/2012 | Agrawal | |
| 2012/0331556 A1 | 12/2012 | Alperovitch et al. | |
| 2013/0246925 A1 | 9/2013 | Ahuja et al. | |
| 2013/0268994 A1 | 10/2013 | Cooper et al. | |

FOREIGN PATENT DOCUMENTS

| | | |
|---|---|---|
| KR | 10-2007-0065267 | 6/2007 |
| KR | 10-2008-0025207 | 3/2008 |
| WO | WO 2007/019521 | 2/2007 |
| WO | WO 2010/008825 | 1/2010 |
| WO | WO 2013/003493 | 1/2013 |
| WO | WO 2013/155239 A1 | 10/2013 |

OTHER PUBLICATIONS

Bonatti, Piero, et al. "An integration of reputation-based and policy-based trust management." networks 2.14 (2007): 10.*

Kai Hwang; Kulkareni, S.; Yue Hu; , "Cloud Security with Virtualized Defense and Reputation-Based Trust Mangement," Dependable, Autonomic and Secure Computing, 2009. DASC '09. Eighth IEEE International Conference on , vol., no., pp. 717-722, Dec. 12-14, 2009.*

Jamie Barnett, Reputation: The Foundation of Effective Threat Protection, McAfee, White Paper, 11 pages, copyright 2010, retrieved Apr. 16, 2012 from http://www.mcafee.com/us/resources/white-papers/wp-rep-effective-threat-protection.pdf.

McAfee GTI Reputation & Categorization Services, copyright 2003-2012, retrieved Apr. 16, 2012 from http://www.mcafee.com/us/mcafee-labs/technology/gti-reputation-technologies.aspx.

TrustedSource: The Next Generation Reputation System for Enterprise Gateway Security, McAfee, White Paper, copyright 2009 McAfee, Inc., 20 pages, retrieved Apr. 16, 2012 from http://www.mcafee.com/us/resources/white-papers/wp-trusted-source-next-gen-rep-sys.pdf.

U.S. Appl. No. 13/170,163, filed Jun. 27, 2011, entitled "System and Method for Protocol Fingerprinting and Reputation Correlation," Inventor(s) Dmitri Alperovitch, et al.

U.S. Appl. No. 13/443,865, filed Apr. 10, 2012, entitled "System and Method for Determining and Using Local Reputations of Users and Hosts to Protect Information in a Network Environment," Inventor(s) Geoffrey Howard Cooper, et al.

International Search Report and Written Opinion for International Application No. PCT/US2012/044453 mailed Jan. 14, 2013.

Non-Final Office Action in U.S. Appl. No. 13/170,163 mailed on Jun. 6, 2014.

Final Office Action in U.S. Appl. No. 13/443,865 mailed on May 22, 2014.

International Search Report and Written Opinion for International Application No. PCT/US2013/036053, mailed Sep. 23, 2013, 14 pages.

USPTO Sep. 13, 2013 Nonfinal Rejection from U.S. Appl. No. 13/443,865.

Josang, Audun et al., "A Survey of Trust and Reputation Systems for Online Service Provision," Decision Support Systems, 43(2), 2007, pp. 618-644, 43 pages.

International Preliminary Report on Patentability for International Application No. PCT/US2013/044453, mailed Jan. 16, 2014, 10 pages.

Davis, Tom "Utilizing Entropy to Identify Undetected Malware" Guidance Software (Publication Date 2009) available online at URL http://image.lifeservant.com/siteuploadfi lesIVSYM/99B5C5 E7-SB46-4 D 14-A53 EBSFD 1 C E EB2BC/43C34073-C29A-SFCE-4B653DBE35B934F7.pdf (11 pages).

International Preliminary Report on Patentability for International Application No. PCT/US2013/036053 mailed on Oct. 14, 2014 (10 pages).

Notice of Allowance in U.S. Appl. No. 13/170,163 mailed on Nov. 26, 2014 (11 pages).

Notice of Allowance in U.S. Appl. No. 13/443,865 mailed on Aug. 29, 2014 (12 pages).

Korean Intellectual Property Office Notice of Preliminary Rejection in Korean Patent Application No. 10-2013-7034510 mailed on Dec. 4, 2014 (Translation) (3 pages).

European Patent Office Supplementary European Search Report and Opinion in EP Application Serial No. 12804840.2 mailed on Jan. 7, 2015 (6 pages).

Japan Patent Office Notice of Reasons for Rejection in JP Application Serial No. 2014-514938 mailed on Jan. 20, 2015 (2 pages).

Notice of Allowance in U.S. Appl. No. 13/170,163 mailed on Mar. 30, 2015 (8 pages).

U.S. Appl. No. 14/580,091, filed Dec. 22, 2014 and entitled System and Method for Determining and Using Local Reputations of Users and Hosts to Protect Information in a Network Environment, inventors Geoffrey Howard Cooper et al. (42 pages).

* cited by examiner

| FILENAME | HASH | SOURCE | DESTINATION |
|---|---|---|---|
| • msnmsgr.exe | 0x03D3F8CEEF2C84D5CCDD6EEA9720AA8E | 172.27.2.49 | 123.45.67.253:7001 |
| • iexplore.exe | 0x02FF22F3AF0108DA2A563ABC9867049F | 172.27.2.49 | 123.69.82.21:80 |
| • iexplore.exe | 0x02FF22F3AF0108DA2A563ABC9867049F | 172.27.2.49 | 123.69.82.20:80 |
| • rasmon.dll | 0x0F9C5408335833E72FE73E6166B5A01B | 172.27.2.49 | 123.69.82.26:443 |
| • nc.exe | 0xAB41B1E2DB77CEBD9E2779110EE3915D | 172.27.2.83 | 172.27.2.49 |
| • AppMgmt.dll | 0x89C9BECFA2518DE49BC2F9BAAB42F64D | 172.27.2.83 | 123.69.82.26:443 |
| • nc.exe | 0xAB41B1E2DB77CEBD9E2779110EE3915D | 172.27.2.21 | 172.27.2.49 |
| • AppMgmt.dll | 0x89C9BECFA2518DE49BC2F9BAAB42F64D | 172.27.2.21 | 123.69.82.26:443 |

FIG. 6

SYSTEM AND METHOD FOR MALWARE AND NETWORK REPUTATION CORRELATION

TECHNICAL FIELD

This disclosure relates in general to the field of network security, and more particularly, to a system and a method for malware and network reputation correlation.

BACKGROUND

The field of network security has become increasingly important in today's society. The Internet has enabled interconnection of different computer networks all over the world. The ability to effectively protect and maintain stable computers and systems, however, presents a significant obstacle for component manufacturers, system designers, and network operators. This obstacle is made even more complicated due to the continually-evolving array of tactics exploited by malicious operators. Once malicious software (e.g., a bot) has infected a host computer, a malicious operator may issue commands from a remote computer to control the malicious software. The software can be instructed to perform any number of malicious actions such as, for example, sending out spam or malicious emails from the host computer, stealing sensitive information from a business or individual associated with the host computer, propagating to other host computers, and/or assisting with distributed denial of service attacks. In addition, the malicious operator can sell or otherwise give access to other malicious operators, thereby escalating the exploitation of the host computers. Security professionals need to develop innovative tools to combat such tactics that allow malicious operators to exploit computers.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 6 is a simplified table that further illustrates some of the details associated with the example attack in the embodiment of the network environment of FIG. 5.

DETAILED DESCRIPTION OF EXAMPLE EMBODIMENTS

Overview

A method is provided in one example embodiment and includes receiving a reputation value based on a hash of a file making a network connection and on a network address of a remote end of the network connection. The network connection may be blocked if the reputation value indicates the hash or the network address is associated with malicious activity. In more specific embodiments, the method may also include sending a query to a threat analysis host to request the reputation value. Additionally or alternatively, the reputation value may be based on query patterns in particular embodiments. In yet more specific embodiments, the network connection may be an inbound connection and/or an outbound connection, and the reputation value may be based on a file reputation associated with the hash and a connection reputation associated with the network address of the remote end of the network connection.

Example Embodiments

Figure 1:
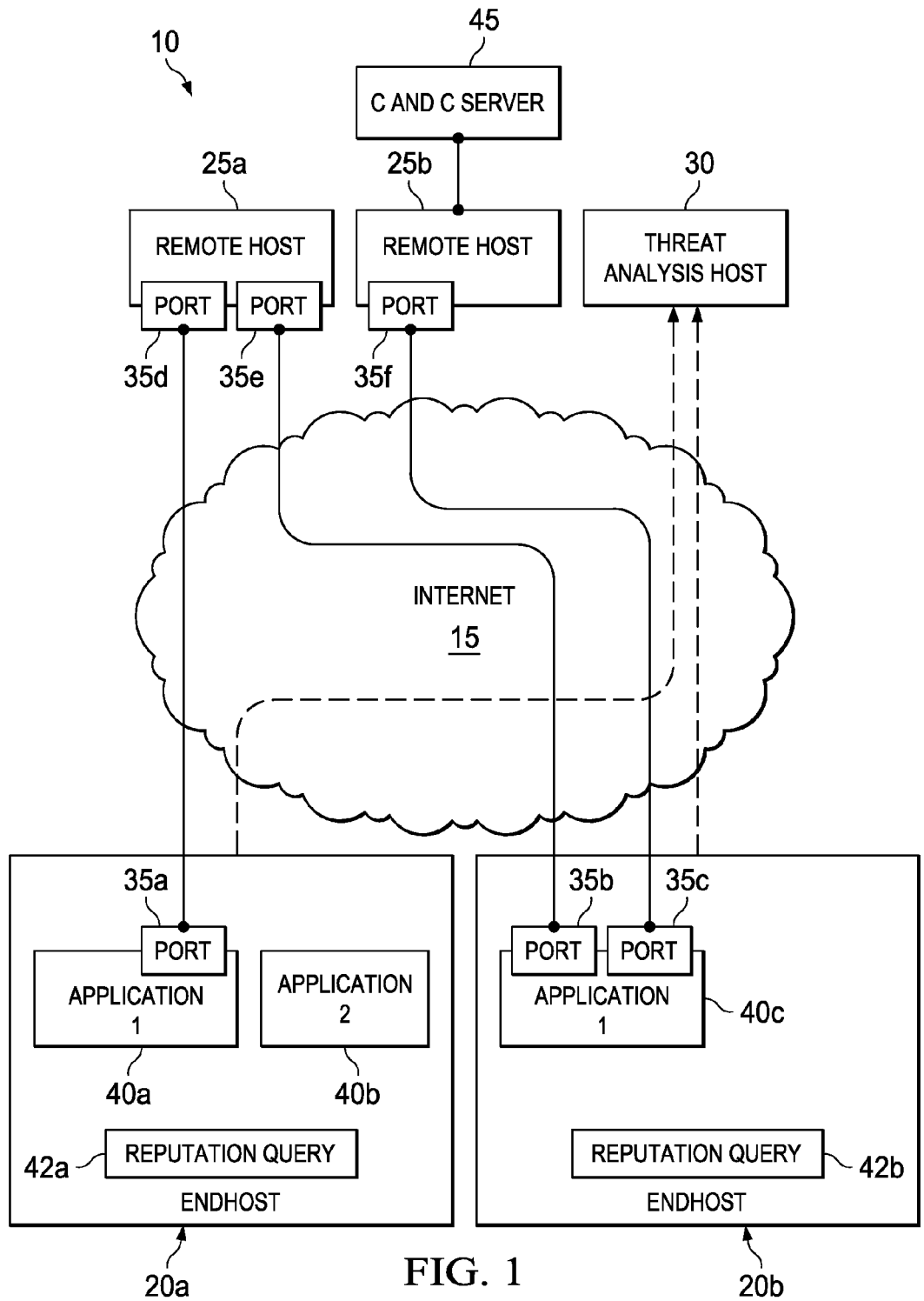
FIG. 1 is a simplified block diagram illustrating an example embodiment of a network environment in which malware and network reputation may be correlated for network protection in accordance with this specification.

Turning to FIG. 1, FIG. 1 is a simplified block diagram of an example embodiment of a network environment 10 in which malware and network reputation may be correlated for network protection. Network environment 10 includes Internet 15, endhosts 20a and 20b, remote hosts 25a and 25b, and a threat analysis host 30. In general, endhosts 20a-b may be any type of termination point in a network connection, including but not limited to a desktop computer, a server, a laptop, a mobile telephone, or any other type of device that can receive or establish a connection with a remote host, for example between any two ports 35a-f. Endhost 20a may execute applications 40a-b and reputation query 42a; endhost 20b may execute application 40c and reputation query 42b. Remote hosts 25a-b generally represent any type of computer or other device that may be compromised by malicious software ("malware"), which may be under the control of a computer or device, such as a command and control (C&C) server 45. Each of endhosts 20a-b, remote hosts 25a-b, threat analysis host 30, and C&C server 45 may have associated Internet Protocol (IP) addresses.

Each of the elements of FIG. 1 may couple to one another through simple interfaces or through any other suitable connection (wired or wireless), which provides a viable pathway for network communications. Additionally, any one or more of these elements may be combined or removed from the architecture based on particular configuration needs. Network environment 10 may include a configuration capable of transmission control protocol/Internet protocol (TCP/IP) communications for the transmission or reception of packets in a network. Network environment 10 may also operate in conjunction with a user datagram protocol/IP (UDP/IP) or any other suitable protocol where appropriate and based on particular needs.

For purposes of illustrating the techniques of the system for network protection against malicious software, it is important to understand the activities occurring within a given network. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typical network environments used in organizations and by individuals include the ability to communicate electronically with other networks using, for example, the Internet to access web pages hosted on servers connected to the Internet, to send or receive electronic mail (i.e., email) messages, or to exchange files with end users or servers connected to the Internet. Malicious users are continuously developing new tactics using the Internet to spread malware and to gain access to confidential information.

Tactics that represent an increasing threat to computer security often include botnets, which have become a serious Internet security problem. In many cases they employ sophisticated attack schemes that include a combination of well-known and new vulnerabilities. Botnets generally use a client-server architecture where a type of malicious software (i.e., a bot) is placed on a host computer and communicates with a command and control server, which may be controlled by a malicious user (e.g., a botnet operator). Usually, a botnet is composed of a large number of bots that are controlled by the operator using a C&C protocol through various channels, including Internet Relay Chat (IRC) and peer-to-peer (P2P) communication. The bot may receive commands from the command and control server to perform particular malicious activities and, accordingly, may execute such commands. The bot may also send any results or pilfered information back to the command and control server.

Botnet attacks generally follow the same lifecycle. First, desktop computers are compromised by malware, often by drive-by downloads, Trojans, or un-patched vulnerabilities. The malware may then subvert these computers into bots, giving a botmaster control over them. The term "malware" generally includes any software designed to access and/or control a computer without the informed consent of the computer owner, and is most commonly used as a label for any hostile, intrusive, or annoying software such as a computer virus, spyware, adware, etc. Once compromised, the computers may then be subverted into bots, giving a botmaster control over them. The botmaster may then use these computers for malicious activity, such as spamming. In addition to receiving commands to perform malicious activities, bots also typically include one or more propagation vectors that enable it to spread within an organization's network or across other networks to other organizations or individuals. Common propagation vectors include exploiting known vulnerabilities on hosts within the local network and sending malicious emails having a malicious program attached or providing malicious links within the emails.

Existing firewall and network intrusion prevention technologies are generally deficient for recognizing and containing botnets. Bots are often designed to initiate communication with the C&C server and to masquerade as normal web browser traffic. Bots may be crafted with a C&C protocol that makes the bot appear to be making normal network connections to a web server. For example, a bot may use a port typically used to communicate with a web server. Such bots, therefore, may not be detected by existing technologies without performing more detailed packet inspection of the web traffic. Moreover, once a bot is discovered, the botnet operator may simply find another way to masquerade network traffic by the bot to continue to present as normal web traffic. More recently, botnet operators have crafted bots to use encryption protocols such as, for example, secure socket layer (SSL), thereby encrypting malicious network traffic. Such encrypted traffic may use a Hypertext Transfer Protocol Secure (HTTPS) port such that only the endpoints involved in the encrypted session can decrypt the data. Thus, existing firewalls and other network intrusion prevention technologies are unable to perform any meaningful inspection of the web traffic. Consequently, bots continue to infect host computers within networks.

Some reputation systems can offer a viable defense to particular botnets. In general, a reputation system monitors activity and assigns a reputation value or score to an entity based on its past behavior. The reputation value may denote different levels of trustworthiness on the spectrum from benign to malicious. For example, a connection reputation value (e.g., minimal risk, unverified, high risk, etc.) may be computed for a network address based on connections made with the address or email originating from the address. Connection reputation systems may be used to reject email or network connections with IP addresses known or likely to be associated with malicious activity, while file reputation systems can block activity of applications having hashes known or likely to be associated with malicious activity. However, connection reputation lookups are driven purely by network traffic and file reputation lookups do not consider any network traffic.

Other software security technology focused on preventing unauthorized program files from executing on a host computer may have undesirable side effects for end users or employees of a business or other organizational entity. Network or Information Technology (IT) administrators may be charged with crafting extensive policies relevant to all facets of the business entity to enable employees to obtain software and other electronic data from desirable and trusted network resources. Without extensive policies in place, employees may be prevented from downloading software and other electronic data from network resources that are not specifically authorized, even if such software and other data facilitate legitimate and necessary business activities. In addition, such systems may be so restrictive that if unauthorized software is found on a host computer, any host computer activities may be suspended pending network administrator intervention. For businesses, this type of system may interfere with legitimate and necessary business activities, resulting in worker downtime, lost revenue, significant Information Technology (IT) overhead, and the like.

In accordance with one embodiment, network environment 10 can overcome these shortcomings (and others) by correlating file and connection reputation. A file hash and network address can be submitted for a reputation lookup when an endhost attempts to establish a connection with a remote host. Reputation information for both the hash and the address can then be analyzed for potential threats, and appropriate policy action can be implemented. Note that a "file," as that term is used herein, broadly includes any unit of data stored in a computer with a single name. In the context of network security, a file is often an executable file comprising instructions that can be understood and processed on a computer, and may further include library modules loaded during execution. Such an executable file is also commonly referred to as an application, software, program file, module, macro, and the like.

For example, IP addresses that are contacted by known malicious hashes may be identified as possible C&C servers or botnet update locations, and hashes that contact known malicious IP addresses may be associated with malware. Furthermore, such hashes may also enable the identification of legitimate applications that have been exploited. If a new exploit in a benign application causes the application to download content from a particular IP address, for instance, a surge in queries from the application can link together the hash with the malicious IP address. Thus, correlation between the two reputation systems enables network locations to be associated with particular malware and vice versa; knowledge of one can provide knowledge of the other. Moreover, unknown applications can be identified as benign by observing that their behavior is consistent with other benign applications. For example, known hashes for a web browser may expose a certain behavior, such as contacting various remote machines on ports 80 and 443 or having a typical inter-arrival time between new connections, etc. If a new hash is observed with similar behavioral traits, it can be deduced that the hash is likely to be a web browser as well.

Figure 2:
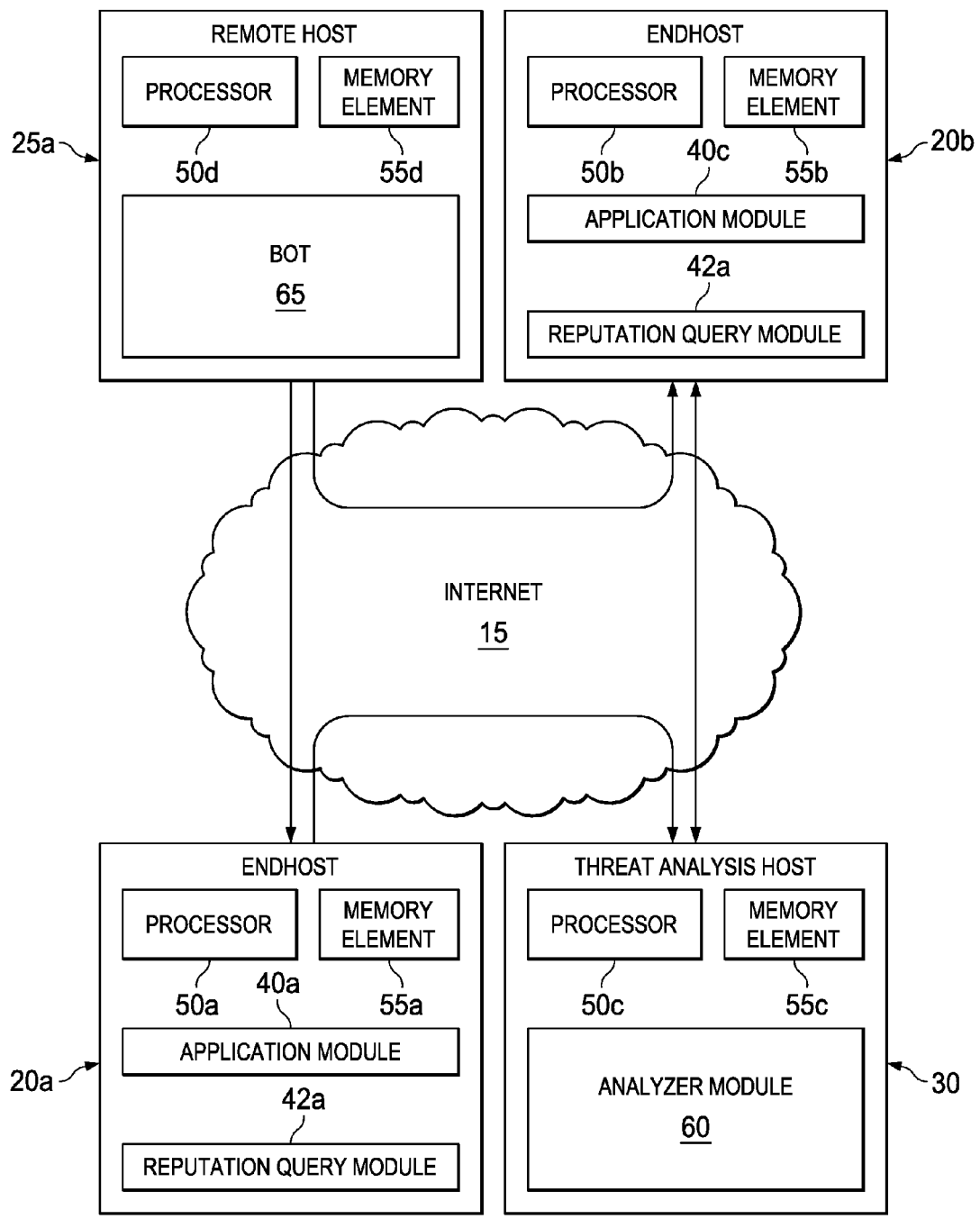
FIG. 2 is a simplified block diagram illustrating additional details associated with one potential embodiment of the network environment, in accordance with this specification.

Turning to FIG. 2, FIG. 2 is a simplified block diagram illustrating additional details associated with one potential embodiment of network environment 10. FIG. 2 includes Internet 15, endhosts 20a-b, remote host 25a, and threat analysis host 30. Each of these elements may include a respective processor 50a-d, a respective memory element 55a-d, and various software elements. More particularly, applications 40a and 40c and reputation query modules 42a-b may be hosted by endhosts 20a-b, analyzer module 60 may be hosted by threat analysis host 30, and bot 65 may be hosted by remote host 25a.

In one example implementation, endhosts 20a-b, remote host 25a, and/or threat analysis host 30 are network elements, which are meant to encompass network appliances, servers, routers, switches, gateways, bridges, load balancers, firewalls, processors, modules, or any other suitable device, component, element, or object operable to exchange information in a network environment. Network elements may include any suitable hardware, software, components, modules, interfaces, or objects that facilitate the operations thereof. This may be inclusive of appropriate algorithms and communication protocols that allow for the effective exchange of data or information. However, endhosts 20a-b may be distinguished from other network elements as they tend to serve as a terminal point for a network connection, in contrast to a gateway or router. Endhosts are also inclusive of wireless network endpoints, such as i-Phones, i-Pads, Android phones, and other similar telecommunications devices.

In regards to the internal structure associated with network environment 10, each of endhosts 20a-b, remote host 25a, and/or threat analysis host 30 can include memory elements (as shown in FIG. 2) for storing information to be used in the operations outlined herein. Additionally, each of these devices may include a processor that can execute software or an algorithm to perform activities as discussed herein. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' The information being tracked or sent by endhosts 20a-b, remote host 25a, and/or threat analysis host 30 could be provided in any database, register, control list, or storage structure, all of which can be referenced at any suitable timeframe. Any such storage options may be included within the broad term 'memory element' as used herein. Similarly, any of the potential processing elements, modules, and machines described herein should be construed as being encompassed within the broad term 'processor.' Each of the network elements can also include suitable interfaces for receiving, transmitting, and/or otherwise communicating data or information in a network environment.

In one example implementation, endhosts 20a-b, remote host 25a, and/or threat analysis host 30 include software (e.g., as part of analyzer module 60, etc.) to achieve, or to foster, operations as outlined herein. In other embodiments, such operations may be carried out externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Note that in certain example implementations, the functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements [as shown in FIG. 2] can store data used for the operations described herein. This includes the memory elements being able to store software, logic, code, or processor instructions that are executed to carry out the activities described herein. A processor can execute any type of instructions associated with the data to achieve the operations detailed herein. In one example, the processors [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Figure 3:
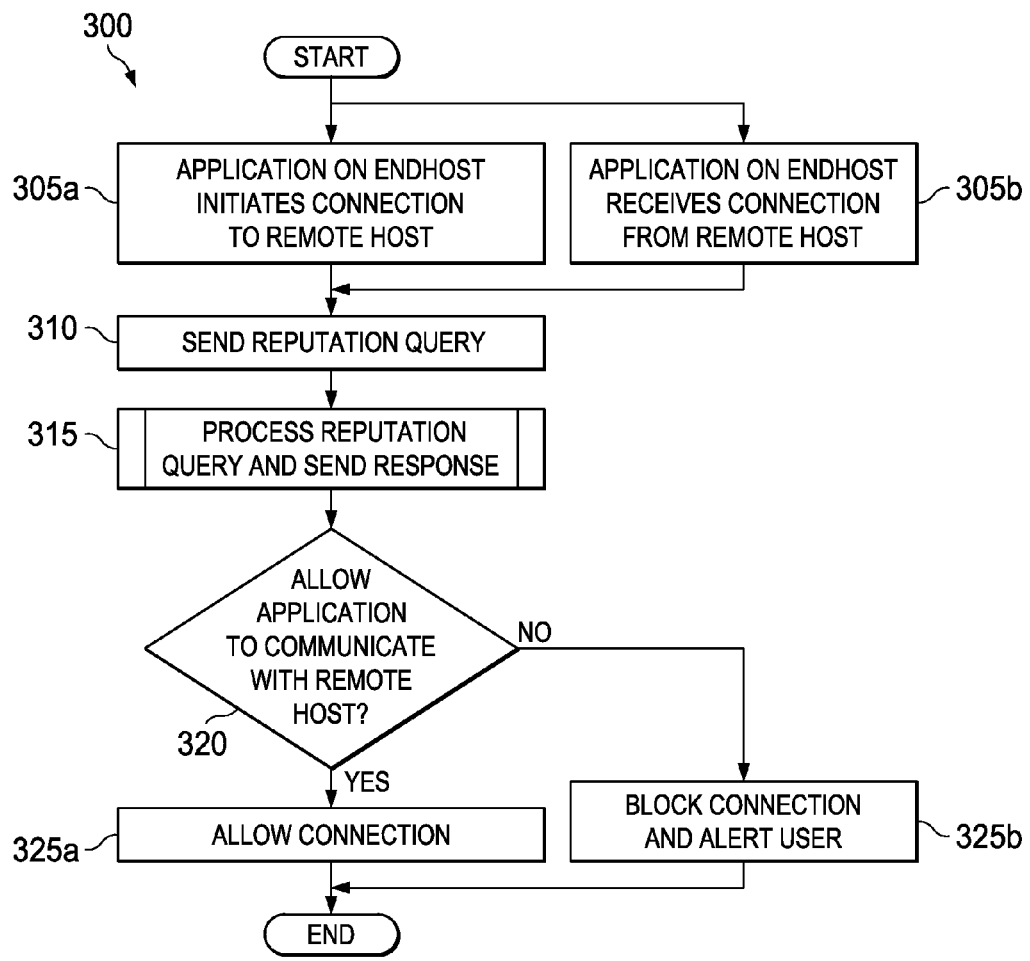
FIG. 3 is a simplified flowchart illustrating example operations associated with an endhost in one embodiment of a network environment in accordance with this specification.

FIG. 3 is a simplified flowchart 300 illustrating example operations associated with an endhost in one embodiment of network environment 10. An application on an endhost, such as application module 20a, attempts to establish a connection with a remote host, either by initiating a connection to the remote host at 305a for an outbound connection or receiving a connection from the remote host at 305b for an inbound connection. For example, a user on a workstation may use a web browser to visit a particular website at 305a. A reputation query may then be sent to a reputation system or threat analysis host at 310. In certain embodiments, the reputation query may be generated by a separate module that can intercept network communications, such as reputation query module 42a. The query may include network addresses and a hash of the application, as well as other connection information such as the transport protocol. Network addresses generally include data that identifies both the endhost and the remote end of the connection, such as the local (endhost) IP address and port and the remote host IP address and port. The reputation query can be processed and a response received at 315. The response may include a reputation value, which can denote different levels of trustworthiness on the spectrum from benign to malicious based on the reputation of the hash and/or the network address. The response can indicate whether the connection with the remote host should be allowed at 320. If the query response indicates that the connection is probably benign, then the connection is allowed at 325a, but if the response indicates that the connection may be malicious, then appropriate action may be taken based on policy. For example, appropriate action may include blocking the connection, as at 325*b*. Alternatively or additionally, the user may be alerted or the activity may be recorded in a log for subsequent forensic analysis.

Figure 4:
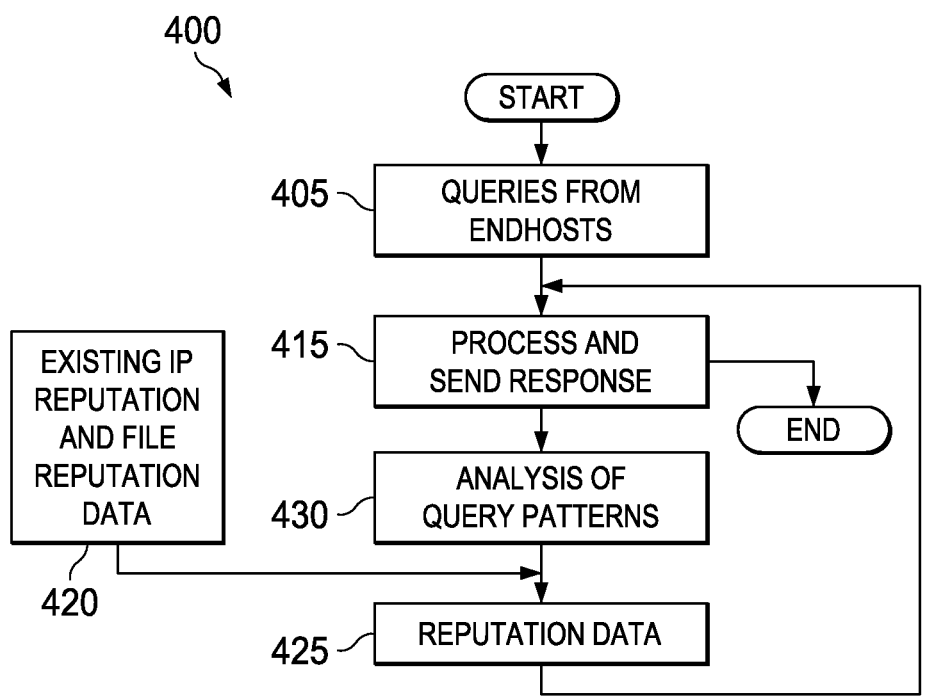
FIG. 4 is a simplified flowchart illustrating example operations associated with processing a reputation query in one embodiment of a network environment in accordance with this specification.

FIG. 4 is a simplified flowchart 400 illustrating example operations associated with processing a reputation query in one embodiment of network environment 10, as may be done at 315 of flowchart 300. A reputation query may be received at 405. The reputation query generally includes information about a connection initiated or received by an endhost. For example, the query may include the IP address and port of the endhost and of a remote host, a hash of the application attempting to initiate or accept a connection, and the transport protocol of the connection. The query can be processed and a response sent at 415. More particularly, the connection information may be analyzed to determine if the IP address of the remote host or the application hash is known to be associated with malicious activity at 420 and 425. Analysis of query patterns and existing reputation data may also be examined at 430 to identify potentially malicious connections in real-time.

Figure 5:
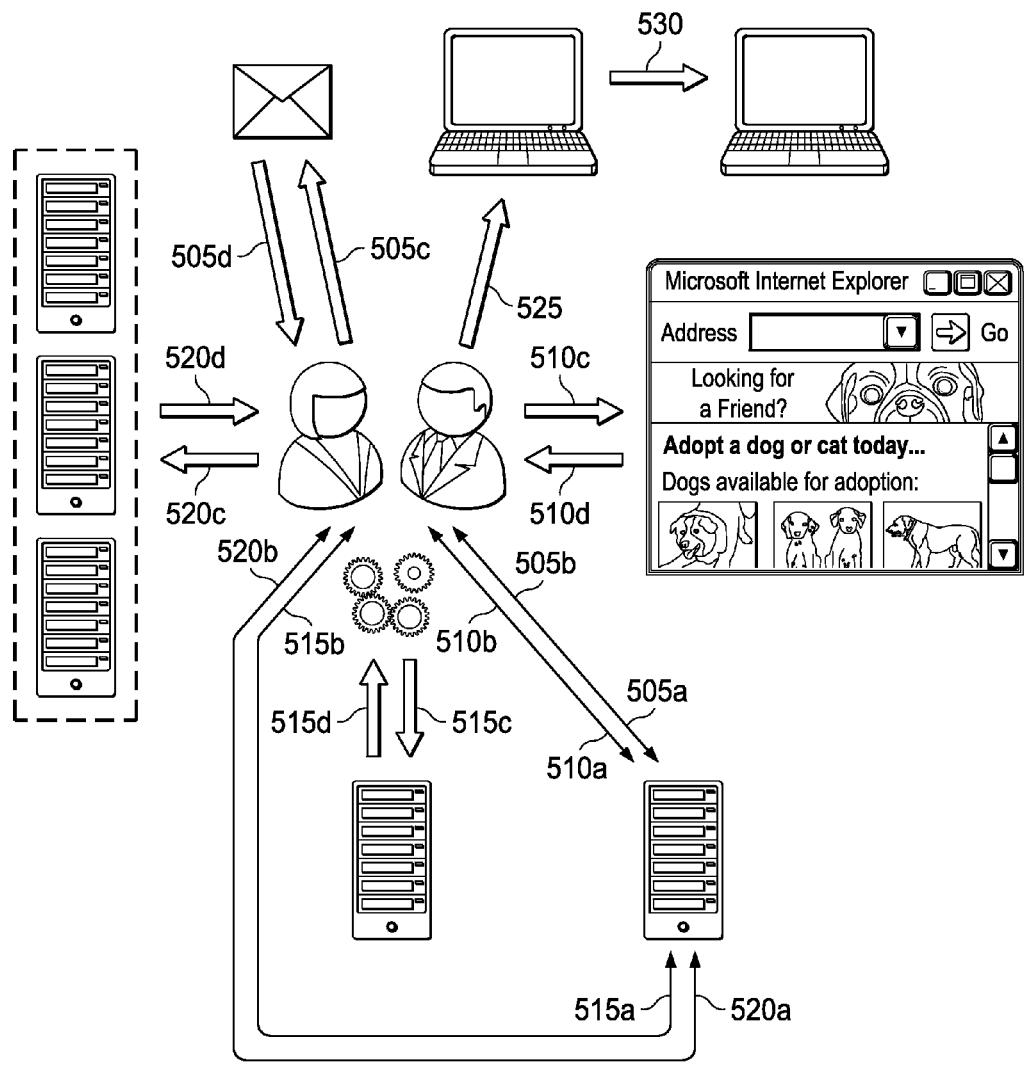
FIG. 5 is a simplified block diagram that illustrates potential operations associated with an example attack in one embodiment of a network environment.

FIG. 5 is a simplified block diagram that illustrates potential operations associated with an example attack in one embodiment of network environment 10. This particular example attack is based on an infamous incident commonly known as "Operation Aurora." The attack is initiated when a target computer running a messaging client, such as an email client or instant messaging client, attempts to connect to a message server and retrieve a malicious message.

In this embodiment of network 10, the target computer first queries a threat analyzer at 505*a* before connecting to the message server. The query includes certain connection attributes, such as the name of the file attempting to establish the connection, the hash or checksum of the file, the network address of the connection source, and the network address of the connection destination. Note that the connection source and connection destination are relative concepts that merely represent opposite ends (local and remote) of a network connection. The threat analyzer evaluates the attributes to identify potential threats, which may be recognized for example by reputation data associated with the file hash, the address of the connection source, or the address of the connection destination. At 505*b*, a response to the query is returned to the client. The connection may be blocked or allowed based on the response. In this example, the messaging client is recognized as a benign file initiating a connection from an address that has not been identified as compromised, and the address of the message server is also recognized as benign. Consequently, this connection may be allowed at 505*c* and the message retrieved at 505*d*.

For purposes of illustrating this attack further, it can be assumed that a user clicks on a hypertext link in the retrieved message, which initiates a web browser process for opening a document on a remote web server. Another query may be sent at 510*a* and a response returned at 510*b*. The connection may be blocked or allowed based on the response. For example, the connection may be blocked if the connection destination address (i.e., the address of the remote web server) has previously been associated with malicious activity. But for illustrating the attack further, it can be assumed that the connection destination address is not known as a malicious address, and the connection may be allowed. Thus, the web browser can connect to the remote web server at 510*c* and retrieve the document from the server at 510*d*.

In this example, the document contains code that exploits a flaw in the web browser, which causes the web browser to initiate a connection with a second malicious server. Before connecting to this malicious server, though, another query may be sent at 515*a* and a response returned at 515*b*. Based on the response, the connection may be blocked or allowed. Again assuming for purposes of illustration that the connection is allowed, though, the web browser may connect to the malicious machine at 515*c*, which can transfer a malicious file to the target computer at 515*d*.

Once installed on the target computer, the malicious file may attempt to connect to a remote server, such as a command and control (C&C) server. However, a query may be first sent to threat analyzer at 520*a* and a response returned at 520*b*. Based on the response, the connection may again be blocked or allowed. If the connection is allowed, the remote server may effectively control the target machine over this connection at 520*c-d*. For example, the remote server may listen for incoming connections to the target computer and install additional malicious files on computers that connect to the target computer at 525 and 530.

FIG. 6 is a simplified table 600 that further illustrates some of the details associated with the example attack in one embodiment of network environment 10 illustrated in FIG. 5. More specifically, FIG. 6 illustrates some of the potential connection attributes that may be included in the queries from the target computer. Table 600 includes a Filename column 605, a Hash column 610, a Source column 615, and a Destination column 620. Filename 605 represents the name of a file attempting to open or accept a network connection. Hash 610 represents a hash value of the file attempting to open or accept the network connection, such as an MD5 checksum value of the file. Source 615 includes the network address associated with the file attempting to open the network connection; Destination 620 represents the network address of the file accepting the network connection.

Thus, to further illustrate the example of FIG. 5, the messaging client may be MSN Messenger, which is commonly named "msnmsgr.exe," and may for example have a hash value of 0x03D3F8CEEF2C84D5CCDD6EEA9720AA8E, and an IP address of 172.27.2.49. If the messaging server has an IP address of 123.45.67.253:7001, then the query at 505*a* may include connection attributes 625. The web browser used at 510*a-d* may be, for example, Internet Explorer, which is commonly named "iexplore.exe," and may have a hash value of 0x02FF22F3AF0108DA2A563ABC9867049F. Since the web browser is also running on the target computer, it may have the same IP address as the message client, in this example 172.27.2.49. If the remote web server has an IP address of 123.69.82.21:80, then the query at 510*a* may include attributes 630. Similarly, if the second malicious server has an IP address of 123.69.82.20:80, then the query at 515*a* may include attributes 635. The malicious file transferred to the target computer at 515*d* may be named "rasmon.dll" with a hash value of 0x0F9C5408335833E72FE73E6166B5A01B, and may attempt to connect to a C&C server having an IP address of 123.69.82.26:443, for example. Accordingly, the query at 520*a* may include attributes 640. Lastly, the remote server may, for example, run a program called netcat ("nc.exe") having a hash value of 0xAB41B1E2DB77CEBD9E2779110EE3915D to accept incoming control connections to the target computer. Thus, if another computer on the local network having an IP address of 172.27.2.83 attempts to connect to the target computer, a query having attributes 645 may be sent, and likewise, if a third computer having an address of 172.27.2.21 attempts to connect to the target computer, a query having attributes 650 may be sent. If the remote server successfully establishes a connection with netcat, then additional malicious files may be installed on the second or third computer. Note that these files need not be identical to the file transferred to the target computer at 515d. To illustrate this in Table 600, these secondary malicious files may be named "AppMgmt.dll" and have a hash value of 0x89C9BECFA2518DE49BC2F9BAAB42F64D, as in attributes 655 and 660, for example.

It is important to reiterate that the attack described above and illustrated in FIG. 5 and FIG. 6 is provided merely as an example, and not as a limitation of the many applications of network environment 10. Moreover, this attack has been used to demonstrate potential operations of network environment 10 at advanced stages of the attack, but when used in a preferred mode of operation, network environment 10 may have blocked the attack at an early stage or prevented it altogether. For example, referring again to Table 600 for details, if the IP address of the malicious web server (i.e., 123.69.82.21:80) had a malicious reputation, then the user's connection at 510c could have been blocked, even though the hash of the web browser itself was not identified as a malicious file. Moreover, once a malicious file attempts to connect to a malicious address, further activity of the file may be blocked based on its hash. Thus, for example, if the address of the C&C server (i.e., 123.69.82.26:443) has a malicious reputation, then the rasmon.dll file can be identified as malicious when it attempts a connection to the C&C server. Any subsequent activity by any file having the same hash as the rasmon.dll file can then be blocked completely, regardless of whether or not it is attempting to connect to a known malicious address.

Figure 7:
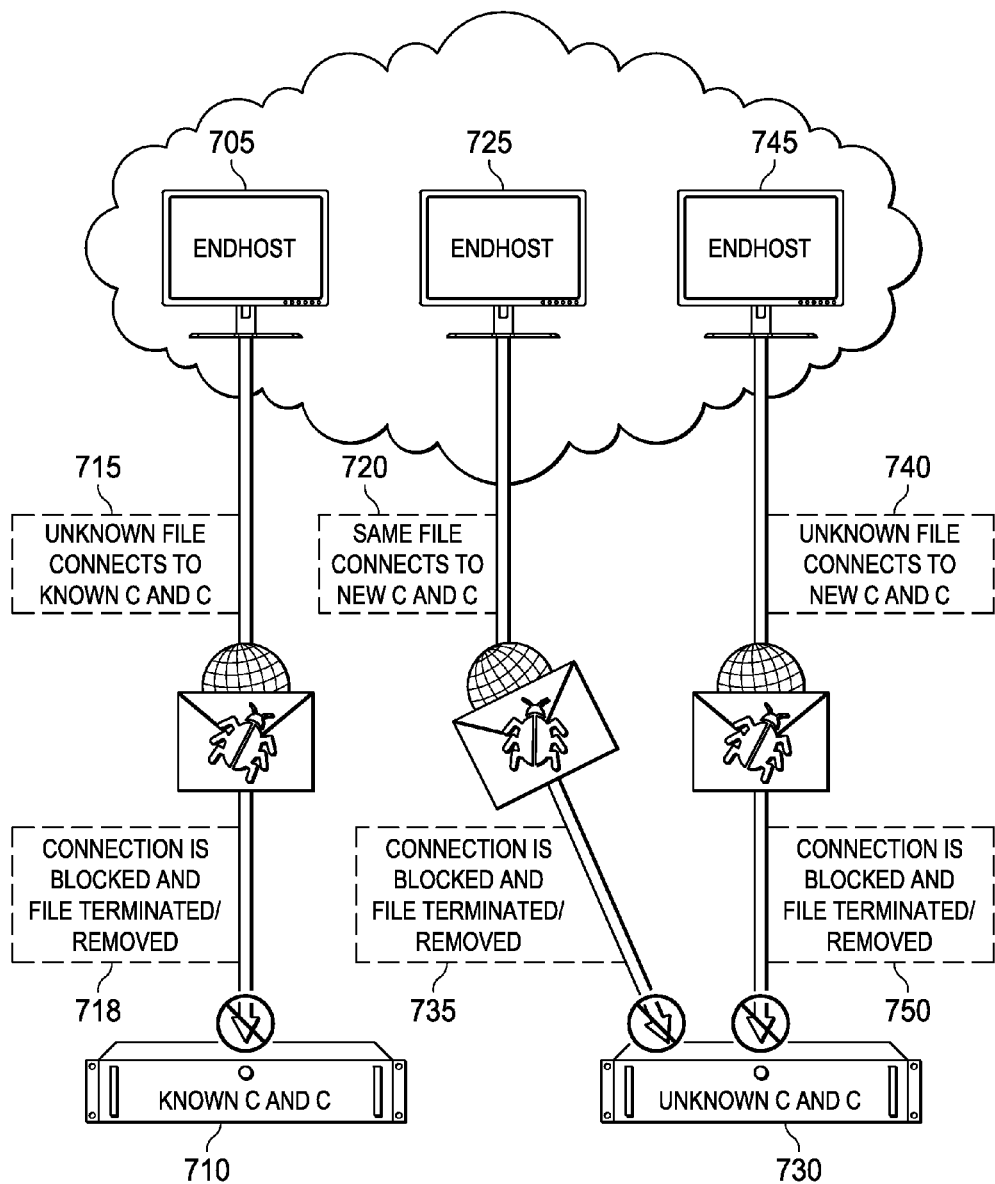
FIG. 7 is a simplified block diagram of another set of potential operations associated with an attack in an embodiment of a network environment according to this specification.

FIG. 7 is a simplified block diagram of another set of potential operations associated with an attack in an embodiment of network environment 10. A previously unidentified file on an endhost 705 attempts to connect to a server 710 at 715. In this example, the network address of server 710 has previously been identified as a C&C server. Consequently, this connection may be blocked at 718 based on the reputation of this network address. Moreover, the reputation of the previously unidentified file on endhost 705 can be adjusted to reflect this malicious activity, with no need to analyze the file itself, and the file may be terminated and/or removed if necessary. At 720, the same file on an endhost 725 attempts to connect to a server 730. In this example, server 730 has a network address that has not previously been identified as a malicious address. However, because the file now has a malicious reputation based on the prior attempt to connect to server 710, this connection may also be blocked at 735, and the reputation of server 730 can also be adjusted to reflect malicious activity. The file may also be terminated and/or removed from endhost 725 if necessary. At 740, another file on endhost 745 attempts to connect to server 730. In this example, this file has no malicious reputation, but the connection may be blocked at 750 based on the reputation of server 730 previously acquired based on the attempted connection at 720. Thus, in this embodiment, real-time correlation between file reputation and network reputation in network environment 10 is able to block previously unknown malware from connecting to a known C&C server, but in real-time can also prevent previously unknown malware from connecting to a previously unknown C&C server. Moreover, this embodiment of network environment 10 may also provide critical forensic information about malicious attacks, allowing an administrator or analyst to determine the exact point of entry and quickly identify compromised computers.

Note that with the examples provided above, as well as numerous other potential examples, interaction may be described in terms of two, three, or four network elements. However, this has been done for purposes of clarity and example only. In certain cases, it may be easier to describe one or more of the functionalities of a given set of operations by only referencing a limited number of network elements. It should be appreciated that network environment 10 is readily scalable and can accommodate a large number of components, as well as more complicated/sophisticated arrangements and configurations. Accordingly, the examples provided should not limit the scope or inhibit the broad teachings of network environment 10 as potentially applied to a myriad of other architectures. Additionally, although described with reference to particular scenarios, where a particular module, such as an analyzer module, is provided within a network element, these modules can be provided externally, or consolidated and/or combined in any suitable fashion. In certain instances, such modules may be provided in a single proprietary unit.

It is also important to note that the steps in the appended diagrams illustrate only some of the possible scenarios and patterns that may be executed by, or within, network environment 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by network environment 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
intercepting, on an endhost, an attempt to establish a network connection with a remote end, wherein a file on the endhost is associated with the network connection;
sending a reputation query including a hash of the file and a network address of the remote end to a threat analysis host to determine whether the network connection associated with the tile should be allowed based on a real-time correlation of a file reputation of the hash and a network reputation of the network address;
receiving a response from the threat analysis host based on the real-time correlation of the file reputation of the hash and the network reputation of the network address, wherein the response indicates the network connection should not be allowed when the real-time correlation includes adjusting the file reputation of the hash to indicate the hash is associated with malicious activity, wherein the adjusting is based, at least in part, on the network reputation of the network address indicating the network address is associated with a malicious server, wherein the response includes a reputation value that indicates a level of trustworthiness from a range of two or more levels of trustworthiness, wherein the reputation value is based, at least in part, on the file reputation of the hash and the network reputation of the network address; and taking a policy action on the network connection when the response indicates the network connection should not be allowed.

2. The method of claim 1, wherein the reputation value is based, at least in part, on query patterns.

3. The method claim 1, wherein the network connection is an inbound connection,

4. The method of claim 1, wherein the network connection is an outbound network connection.

5. The method of claim 1, wherein the policy action comprises blocking the network connection.

6. The method of claim 1, wherein the policy action comprises alerting a user.

7. The method of claim 1, wherein the policy action comprises creating a log of the network connection.

8. The method of claim 1, wherein the file reputation is adjusted without analyzing the file.

9. One or more non-transitory tangible media that includes code for execution and the code, when executed by one or more processors, is operable to perform operations comprising:

intercepting, on an endhost, an attempt to establish a network connection with a remote end, wherein a file on the endhost is associated with the network connection;

sending a reputation query including a hash of the file and a network address of the remote end to a threat analysis host to determine whether the network connection associated with the file should be allowed based on a real-time correlation of a file reputation of the hash and a network reputation of the network address;

receiving a response from the threat analysis host based on the real-time correlation of the file reputation of the hash and the network reputation of the network address, wherein the response indicates the network connection should not be allowed when the real-time correlation includes adjusting the file reputation of the hash to indicate the hash is associated with malicious activity, wherein the adjusting is based, at least in part, on the network reputation of the network address indicating the network address is associated with a malicious server, wherein the response includes a reputation value that indicates a level of trustworthiness from a range of two or more levels of trustworthiness, wherein the reputation value is based, at least in part, on the file reputation of the hash and the network reputation of the network address; and taking a policy action on the network connection when the response indicates the network connection should not be allowed.

10. The one or more non-transitory tangible media of claim 9, wherein the reputation value is based, at least in part, on query patterns.

11. The one or more non-transitory tangible media of claim 9, wherein the network connection is an inbound connection.

12. The one or more non-transitory tangible media of claim 9, wherein the network connection is an outbound network connection.

13. The one or more non-transitory tangible media of claim 9, wherein the policy action comprises blocking the network connection.

14. The one or more non-transitory tangible media of claim 9, wherein the policy action comprises alerting a user.

15. The one or more non-transitory tangible media of claim 9, wherein the policy action comprises creating a log of the network connection.

16. The one or more non-transitory tangible media of claim 9, wherein the file reputation is to be adjusted without analyzing the file.

17. An apparatus, comprising:
an analyzer module comprising instructions;
one or more hardware processors configured to execute the instructions associated with the analyzer module, to perform operations comprising:

intercepting an attempt to establish a network connection with a remote end, wherein a file on the apparatus is associated with the network connection;

sending a reputation query including a hash of the file and a network address of the remote end to a threat analysis host to determine whether the network connection associated with the file should be allowed based on a real-time correlation of a file reputation of the hash and a network reputation of the network address;

receiving a response from the threat analysis host based on the real-time correlation of the file reputation of the hash and the network reputation of the network address, wherein the response indicates the network connection should not be allowed when the real-time correlation includes adjusting the file reputation of the hash to indicate the hash is associated with malicious activity, wherein the adjusting is based, at least in part, on the network reputation of the network address indicating the network address is associated with a malicious server, wherein the response includes a reputation value that indicates a level of trustworthiness from a range of two or more levels of trustworthiness, wherein the reputation value is based, at least in part, on the file reputation of the hash and the network reputation of the network address; and taking a policy action on the network connection when the response indicates the network connection should not be allowed.

18. The apparatus of claim 17, wherein the reputation value is based, at least in part, on query patterns.

19. The apparatus of claim 17, wherein the network connection is an inbound connection.

20. The apparatus of claim 17, wherein the network connection is an outbound network connection.

21. The apparatus of claim 17, wherein the policy action comprises blocking the network connection.

22. The apparatus of claim 17, wherein the policy action comprises alerting a user.

23. The apparatus of claim 17, wherein the policy action comprises creating a log of the network connection.

24. The apparatus of claim 17, wherein the file reputation is to be adjusted without analyzing the file.

* * * * *